A. S. CAMPBELL.
BATTERY CASE OR CABINET.
APPLICATION FILED MAR. 31, 1909.
1,041,018.
Patented Oct. 15, 1912.
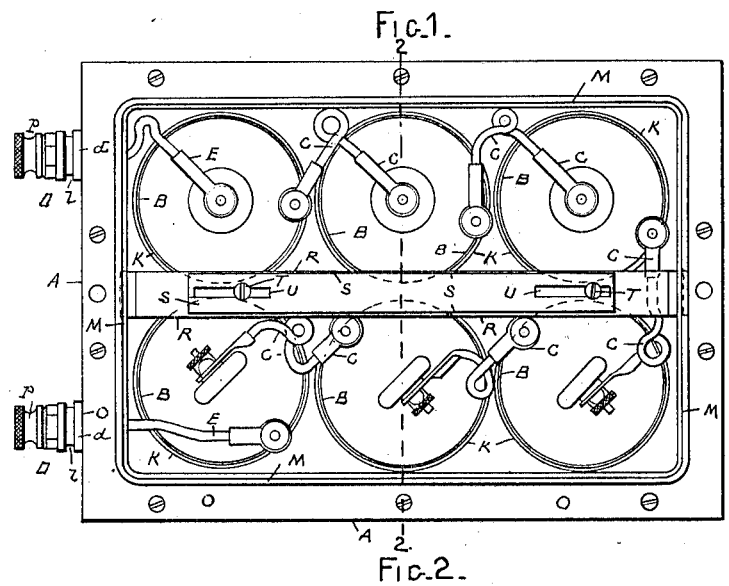
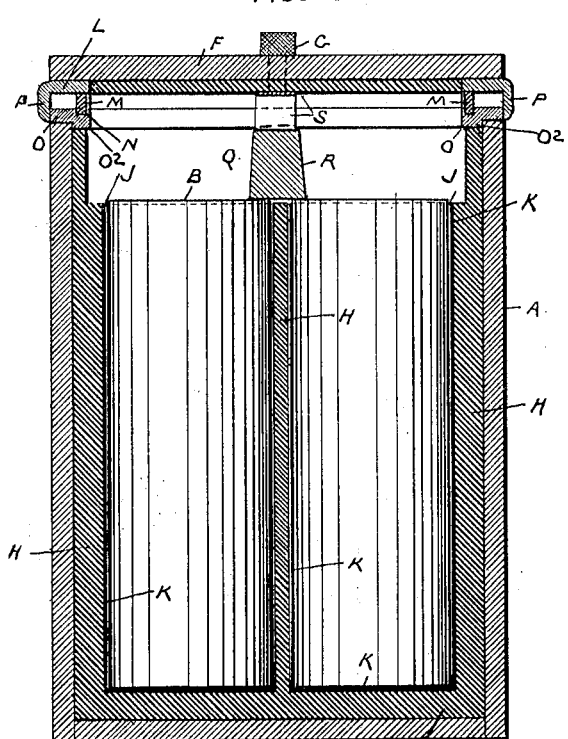
WITNESSES.
Marion E. Brown
Samuel Griffin
INVENTOR.
ALPHONSO S. CAMPBELL
BY
Albert W Brown
ATTORNEY.

UNITED STATES PATENT OFFICE.

ALPHONSO S. CAMPBELL, OF MEDFORD, MASSACHUSETTS.

BATTERY CASE OR CABINET.

1,041,018.  Specification of Letters Patent.  Patented Oct. 15, 1912.

Application filed March 31, 1909. Serial No. 487,010.

*To all whom it may concern:*

Be it known that I, ALPHONSO S. CAMPBELL, a citizen of the United States, residing at the city of Medford, in the county of Middlesex and State of Massachusetts, have invented new and useful Improvements in Battery Cases or Cabinets, of which the following is a specification.

This invention relates to a disposition and securing against accidental movement or displacement within a box or case of wood, of a series or set of dry battery-cells, severally suitably within the box electrically connected and also electrically connected to terminals or binding posts at the outside of and made fast to the box and in a manner to absolutely insure the boxing or case against entrance of moisture thereto and to permit the battery-cells, as may be desired, to be readily removed and replaced at pleasure.

In the accompanying drawings, forming part of this specification, this invention is illustrated.

Figure 1 is a plan view of the body of the box or case when opened, or, in other words, with its cover removed. Fig. 2 is a central transverse vertical section on dotted line 2—2, Fig. 1.

In the drawings, A is the box or case; B, B are the dry battery-cells, as shown, six in number; C, C are the several wire electric connections of said battery-cells; D, D are the terminals or binding-posts, connected by wires E, E with the battery-cells and otherwise, outside of the box, each is to be suitably electrically connected, all as well known, except as hereinafter stated.

F is the cover of the box A, detachably connected and fastened in position by headed-screws G, at its opposite ends (only one shown) which pass loosely through the cover and screw into the opposite ends of the box at its upper edge. See Fig. 2. The box and its cover F are made preferably of wood, oak or mahogany. The inside surfaces of the box or casing are coated or lined with a molded or otherwise formed water-proof composition or other material shown at H of a one-half inch or other suitable thickness. This composition is used in further quantity and extended in the box body to constitute walls forming a series of vertical chambers J corresponding in number to the battery cells and shaped to conform to the contour of said cells. In other words, within the casing there is a body preferably in solid mass of water-proof material having a plurality of battery cell receiving chambers or pockets distributed at intervals therein. In order that the cells may be maintained in fixed operative relationship the walls of the chambers are curved closely to conform to the contours of the cells contained therein. These curved walls are found to present a very advantageous construction since by their curvature and variable thickness they form arches extending transversely to the lengths of the cell-containing pockets and as a result the walls, by virtue of their form, maintain themselves permanently in place and effectually resist any displacement, breaking or distortion thereof such as would be bound to occur if a flat thin wall were relied on to hold the heavy cells in place. The chambers do not extend entirely through the body of water-proof material but terminate above the base thereof to form bottoms for said chambers. Each of said chambers J may have a shell K of water-proof pasteboard or other suitable material covering the sides and bottom of said chambers.

L is a composition metal ring secured to the underside of the cover and in position to bear and press on an india-rubber gasket or ring M, continuously surrounding the upper edge of the box-body and held in a groove N, of proper shape, of a composition metal ring O surrounding and attached to said upper edge of the box-body.

P is a downward projecting composition metal flange surrounding and secured to the edge of the cover and all such that when the cover is in place said flange will overlap, preferably closely, the several sides of the box, see Fig. 2.

Q is a chamber within the box above the battery-cells formed by the termination of the cell containing walls beneath the top of the casing. In this chamber are located the several electric wire-connections before described and so placed they, obviously, can be readily examined and handled, battery-cells removed and replaced, &c., all as may be desired.

R is a wooden presser bar or block in the chamber Q and lying lengthwise of the box and at rest on the upper ends of the two rows of battery-cells.

S is a bowed shaped spring formed from a thin flat strip of metal and located on and along the upper edge of the bar. This spring S is confined on the block by means of headed-screws T at its opposite ends and entered through short lengthwise running slots U of the spring. This manner of attachment of the spring S, when downward pressure is applied to it, permits the spring under such pressure to extend lengthwise, as it were, and on removal of such pressure to return to its normal position.

With the battery-cells positioned and connected, and the bar R, its spring S uppermost, placed over the tops of the battery-cells and the box-cover applied and made firm and fast to the box, obviously the rubber gasket will be compressed, packing the joint between the box and its cover, and, by the then compression of the spring S, the bar R is forced into and held in position elastically confining the battery-cells against accidental movement or displacement, and furthermore, as one whole, as is plain, no water or moisture can possibly enter the box at any point or points thereof.

The number of battery-cells may be increased or decreased as may be desired and the case especially adapted for whatever the number may be.

I do not limit myself to the use of any particular kind of water-proofing insulating medium or composition nor to the fact that a water-proof and insulating medium is used.

The metal ring O having the gasket M, has a flange $O^2$ which projects downward and is shaped to surround and fit the inner surface of the box, at the upper open edge, see Fig. 2.

Having thus described my invention what I claim and desire to secure by Letters Patent is,

1. A container for dry battery cells comprising, in combination, a casing; a cover therefor; means to secure said cover to said casing; a body of waterproof material inclosed by said casing, said body being formed to present a plurality of cell-receiving pockets having walls shaped closely to fit and conform to the contours of said cells, said walls being of substantial thickness and arched transversely to the lengths of said pockets sufficiently to maintain said walls upright in fixed relationship, said body being formed to provide above said pockets beneath said cover a chamber for containing the contacts of said cells and means to prevent said cells from sliding out of their pockets into said contact-containing chamber.

2. A container for dry battery cells comprising, in combination, a casing; a cover therefor; means to secure said cover to said casing; a body of waterproof material inclosed by said casing, said body being formed to present a plurality of cell-receiving pockets having walls shaped closely to fit and conform to the contours of said cells, said walls being of substantial thickness and arched transversely to the lengths of said pockets sufficiently to maintain said walls upright in fixed relationship, said body being formed to provide above said pockets beneath said cover a chamber for containing the contacts of said cells, and a spring-pressed bar to prevent said cells from sliding out of their pockets into said contact-containing chamber.

In witness whereof, I have hereunto set my hand in the presence of two subscribing witnesses.

ALPHONSO S. CAMPBELL.

Witnesses:
ALBERT W. BROWN,
MARION E. BROWN.

---

Copies of this patent may be obtained for five cents each, by addressing the "Commissioner of Patents, Washington, D. C."